Figure 1:
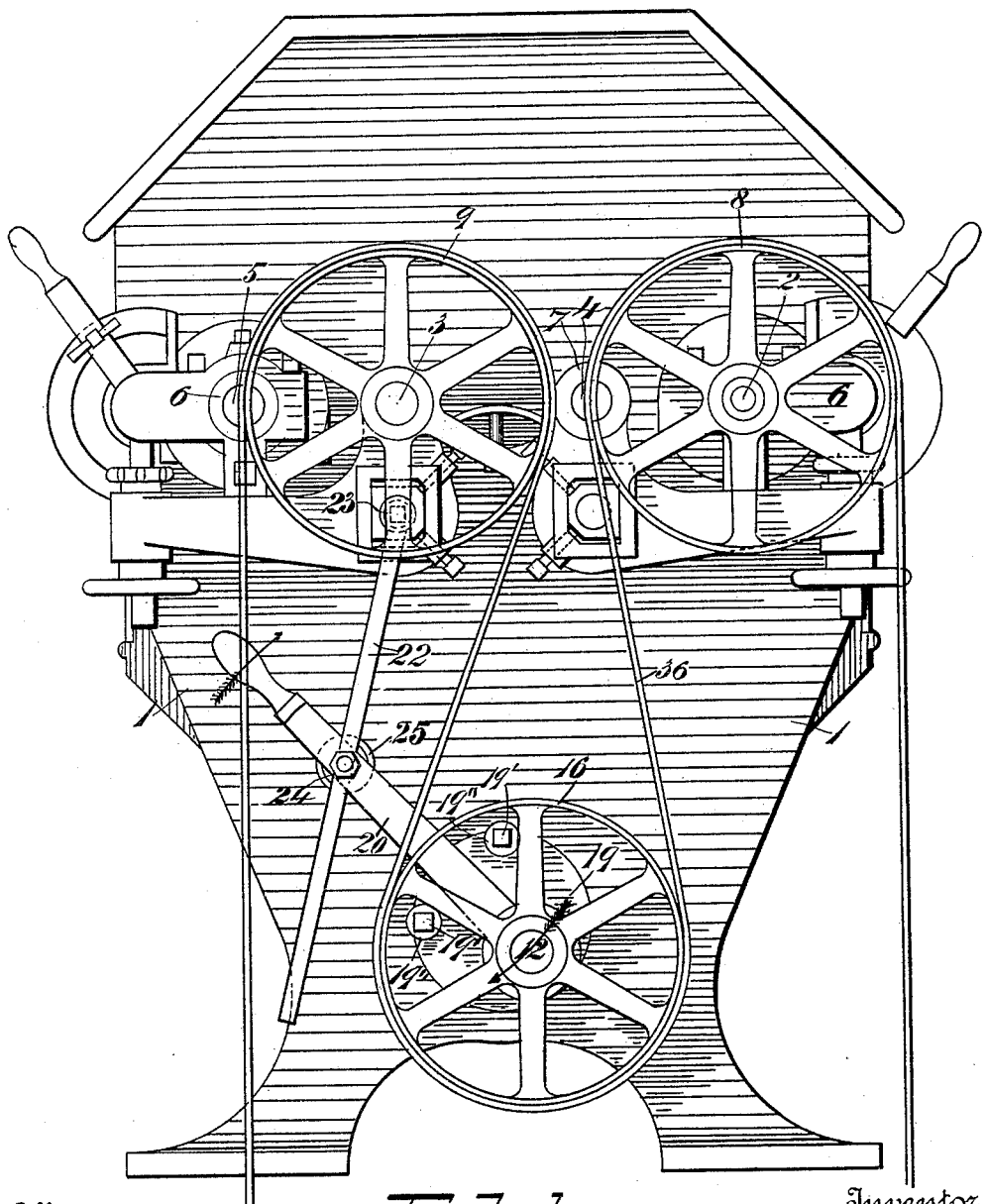

(No Model.)

3 Sheets—Sheet 1.

J. B. ALLFREE.
BELT TIGHTENER.

No. 467,712.

Patented Jan. 26, 1892.

Witnesses

Inventor

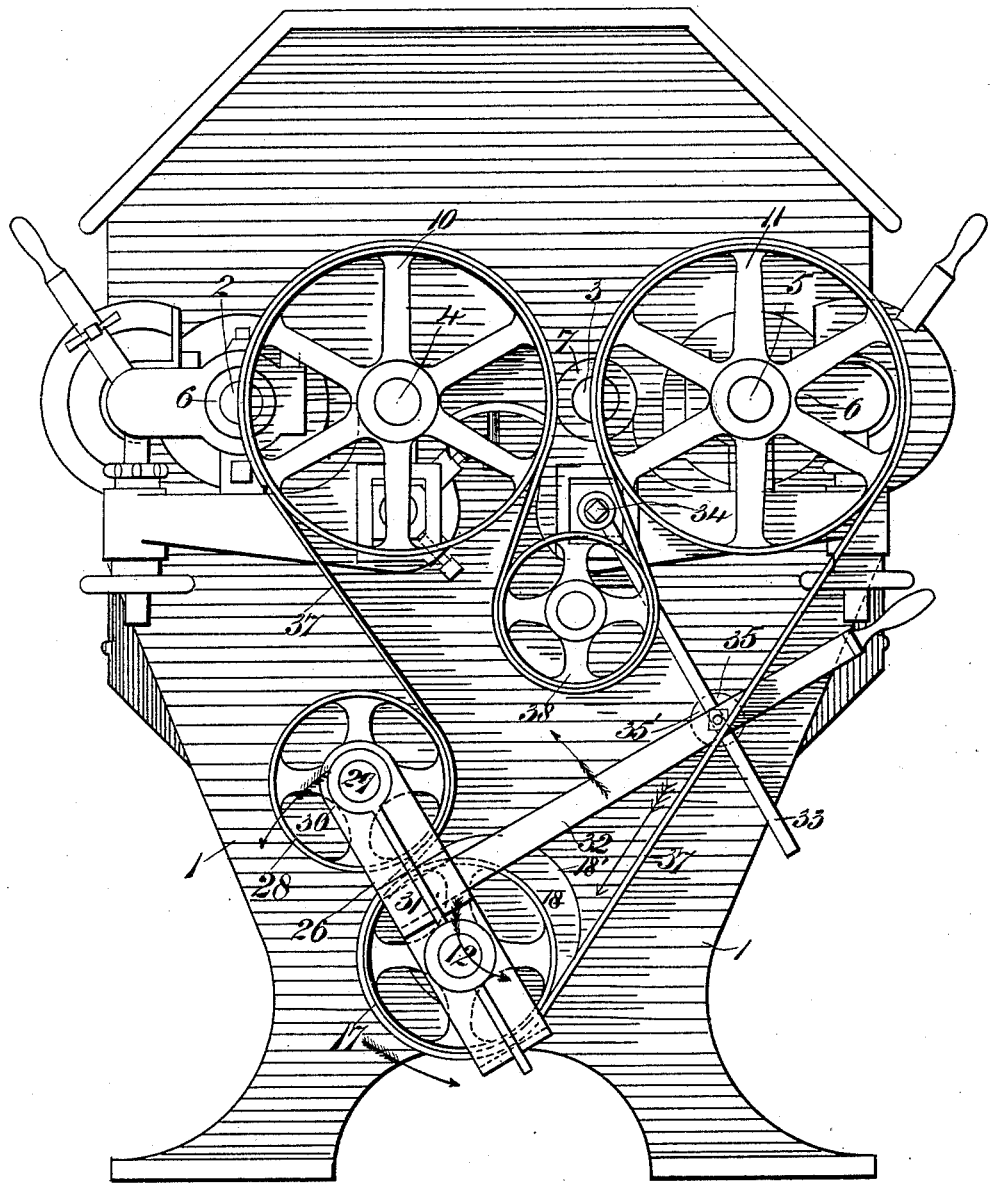

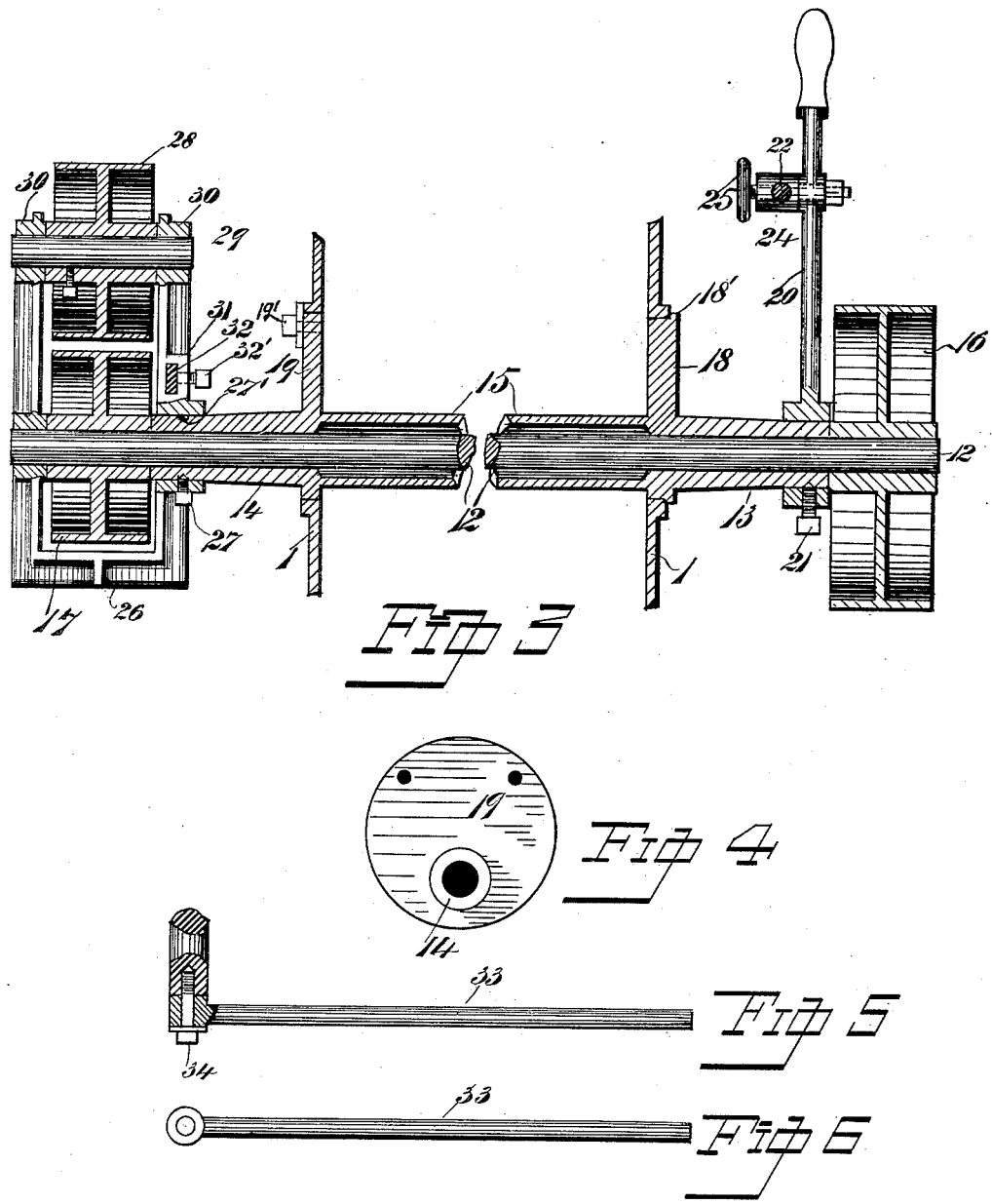

UNITED STATES PATENT OFFICE.

JAMES B. ALLFREE, OF INDIANAPOLIS, INDIANA.

BELT-TIGHTENER.

SPECIFICATION forming part of Letters Patent No. 467,712, dated January 26, 1892.

Application filed April 24, 1891. Serial No. 390,318. (No model.)

*To all whom it may concern:*

Be it known that I, JAMES B. ALLFREE, a citizen of the United States, residing at Indianapolis, in the county of Marion and State of Indiana, have invented new and useful Improvements in Belt-Tighteners, of which the following is a specification.

My invention relates to a belt-tightening device, designed particularly for use in connection with roller grinding-mills or other similarly-driven machines having separate driving and driven belts contacting with or working on a pulley or pulleys on the same, and a raising and lowering main or counter shaft; and it consists in mechanism for automatically maintaining a constant and regular tension on one belt while the other manually-operated bell-tightener is adjusted or set, all of novel construction, hereinafter more fully set forth.

The object of my invention is to provide means whereby the main belt may be adjusted to any degree of tension without causing any appreciable variation in the tension of the differential or driven belt; also, means whereby the belt-tightener of the driven or differential belt may be set and adjusted to produce any required degree of tension without causing any variation of tension in the main belt and without affecting the automatic action of said tightener by a change of its position. I attain these objects by the mechanism illustrated in the accompanying drawings, in which—

Figure 1 is an end elevation of a roller grinding-mill, showing my arrangement of belt-tightener applied thereto. Fig. 2 is an end elevation of the differential or slowly-driven end of the same, showing the tension-compensating and belt-tightening mechanism, which is the principal feature of my invention. Fig. 3 is a longitudinal sectional elevation of the eccentric bearing of the main or counter shaft bearing, showing the main belt-tightening and the differential belt-tightening pulleys. Fig. 4 is an end elevation of the eccentric counter-shaft bearing. Fig. 5 is a detail view of the distance-rod of the belt-tightening levers, showing its pivotal pin; and Fig. 6 is a detached view of the same.

Similar numbers of reference designate like parts throughout the several views.

1 designates the framing of a roller grinding-mill having the grinding-rollers 2, 3, 4, and 5 journaled in any suitable and adjustable bearings 6 and 7, said rollers having the driving-pulleys 8, 9, 10, and 11 firmly mounted and secured thereon, whereby they receive their rotative motion.

12 designates the counter-shaft of a grinding-mill journaled eccentrically in the bearings 13 and 14, formed eccentrically on the disks 18 and 19 and connected rigidly by the eccentric shaft, counter-shaft boxes, or distance-tube 15, formed integral thereon.

16 designates the main-belt-tightening pulley, and 17 designates the differential driving-pulley, said pulleys firmly secured on said counter-shaft or eccentric shaft to transmit motion from said main belt to said differential belt.

On the ends of the tube 15 and integral therewith are also formed the eccentric disk 18, having the flange 18' formed thereon, and the plain disk 19, said disks accurately fitting and adapted to turn in suitable bearings formed in the frame 1.

19' designates suitable securing-bolts screwed in the disks 19 at a point at or near their peripheries to permit the washer 19" to project over the edge thereof to form a bearing against the frame 1 and to maintain a close bearing between the said washer and the flange 18' and the frame 1 and thereby prevent said bearings 13 and 14 from sliding laterally.

20 designates eccentric-shaft lever of the main-belt tightener securely mounted on the eccentric bearing 13 and held in position by the set-screw 21.

22 designates the distance-rod of the lever 20, pivoted on the bolt or pin 23, secured firmly to the frame 1 or any rigid part thereof, and having its free end adapted to slide in the socket 24, pivotally secured to the tightening-lever 20, said distance-rod clamped in said socket by the clamping-screw 25 for the purpose of maintaining said belt-tightening lever in any required position.

26 designates the differential pulley carrying or supporting lever arm or fork pivotally secured on the eccentric box or bearing 14 by the set-screw 27, adapted to work in the groove 27' formed in said bearing and having its outer arm adapted to receive and neatly fit the outer end of the shaft 12 on which it freely swings.

28 designates the differential belt-tightening pulley secured on the arbor 29, journaled in the bearings 30, formed on the ends of the pulley-carrying supporting-lever arm 26. On the arm 26 is also formed the socket 31, adapted to receive the end of the tightening-lever 32 and adjustably secured thereon by the set-screw 32'.

33 designates the differential distance-rod pivoted on the bolt or pin 34, secured to the frame 1 or any other rigid part thereof at a certain predetermined position hereinafter described, and having its free end adapted to slide in the socket 35, pivotally secured on the lever 32 at a certain predetermined point thereon hereinafter described, said distance-rod clamped in said socket by the securing-screw 35' for the purpose of maintaining the lever 32 in any required position.

36 designates the main driving-belt for driving the pulleys 8 9, and 16 and 37 designate the differential driving-belt contacting the pulleys 17, 28, 10, 11, and 38.

The operation of the mechanism is as follows: When it is desired to tighten the main driving-belt 36, the set-screw 25' is unscrewed and the lever 20 is raised upwardly and in the direction of the arrow (the lever in Fig. 1 is shown at or near its highest position to give tension to the belt) to rotate the eccentric bearings 13 and 14 and consequently to lower or move downwardly the shaft 12 journaled therein and its pulley 16, secured thereon farther distant from the driving-pulleys 8 and 9 to produce the required tension in said belt. Simultaneously with the downward movement of the pulley 16 has also moved the pulley 17 in the same direction, which movement, if communicated directly to all the pulleys—that is, the pulleys 10, 11, and 17—by the belt, would cause a tightening of the latter and produce an unequal stress or tension thereon for each different position of said pulley 17. To compensate for this inequality in the stress or tension of the belt, I arrange the tension mechanism to work as follows: The fork 26, hereinbefore described, having its adjusting-lever 32 rigidly secured thereto and held in any desired and fixed position by the pivotal distance-rod 33, pivotally secured at a fixed point on the frame 1 and to the lever 32, is caused to swing outwardly, as indicated by the arrow, carrying the pulley 28 outwardly with it and consequently farther from said belt 37 to reduce its tension and to compensate for the increase in tension resulting from the driving downward movement of the pulley 17 to tighten it. Thus it will be seen that the eccentric boxes 13 and 14, wherein the main shaft is journaled, are rotated to move the main drive-pulley 16 upwardly or downwardly to decrease or increase the tension of the main driving-belt 36, and the pulley 17 on the opposite or differential end of the shaft is also caused to have a similar movement, it being on the same shaft; but owing to the mechanism, as described above, the idler-pulley 28 is caused to approach or recede from the belt 37 simultaneously with the downward or upward movement of the pulley 17 to either slacken or diminish, tighten or decrease the tension of the belt 37, and thereby maintaining said belt at a uniform tension, no matter what the position of the pulley 17 may be relatively to the other pulleys. The belt 37 may be readily tightened to any degree of tension independently of the movement of the belt or the mechanism on the driving side of the machine and without in any manner affecting the mechanical movement by lowering the lever 32 and securing it in its new position by means of the set or clamping screw 35'.

The position of the pivotal pin 34 and the socket on the lever 32 is of the greatest importance to the successful and accurate movement of the pulley 28 and must be carefully determined by experiment, a position other than the correct one of either of the above points resulting in an irregular movement of said pulley 28 not commensurate with the movement of the pulley 17.

Having thus fully described the construction and operation of my invention, what I claim as new and useful, and desire to cover by Letters Patent of the United States therefor, is—

1. In a belt-tightening device, the combination, with an eccentric shaft-bearing and the shaft journaled therein, of a pulley-carrying lever-arm adjustably journaled on said eccentric bearing and means whereby said lever-arm is automatically moved to cause the pulley thereof to recede or approach the belt to maintain a uniform tension, substantially as set forth.

2. In a belt-tightening device, the combination, with an eccentric shaft-bearing, the shaft journaled therein, and a suitable frame, of a pulley-carrying lever-arm adjustably journaled on said eccentric shaft-bearing, a lever projecting from said arm, and a connecting or distance rod pivoted at a fixed point on said frame at one end and having its opposite end pivoted to said lever on pulley-carrying arm, whereby the latter arm and its pulley may be either independently or automatically moved, substantially as set forth.

In testimony whereof I have hereunto set my hand in the presence of two subscribing witnesses.

JAMES B. ALLFREE.

Witnesses:
E. A. HALLAM,
THOMPSON R. BELL.